(12) United States Patent
Maniwa (10) Patent No.: US 9,120,235 B2
(45) Date of Patent: Sep. 1, 2015

(54) ELECTRIC SCISSORS

(75) Inventor: Yoshihiro Maniwa, Tokyo (JP)

(73) Assignee: MAX CO., LTD., Tokyo (JP)

(*) Notice: Subject to any disclaimer, the term of this patent is extended or adjusted under 35 U.S.C. 154(b) by 497 days.

(21) Appl. No.: 13/532,967

(22) Filed: Jun. 26, 2012

(65) Prior Publication Data

US 2013/0000130 A1    Jan. 3, 2013

(30) Foreign Application Priority Data

Jun. 28, 2011    (JP) ................................. 2011-143174

(51) Int. Cl.
*B26B 15/00*      (2006.01)
*A01G 3/037*     (2006.01)

(52) U.S. Cl.
CPC ................ *B26B 15/00* (2013.01); *A01G 3/037* (2013.01)

(58) Field of Classification Search
CPC ................................ B26B 15/00; A01G 3/037
USPC ........................................................... 30/228
See application file for complete search history.

(56) References Cited

U.S. PATENT DOCUMENTS

| | | | |
|---|---|---|---|
| 5,867,909 A * | 2/1999 | Jeltsch et al. | 30/228 |
| 8,122,607 B2 * | 2/2012 | Maniwa et al. | 30/228 |
| 8,656,597 B2 * | 2/2014 | Pellenc | 30/194 |
| 2009/0241351 A1 | 10/2009 | Maniwa et al. | |
| 2010/0064527 A1 * | 3/2010 | Lee et al. | 30/228 |
| 2010/0192383 A1 | 8/2010 | Ishiguro | |
| 2011/0147026 A1 | 6/2011 | Pellenc | |
| 2013/0000130 A1 * | 1/2013 | Maniwa | 30/228 |
| 2014/0165411 A1 * | 6/2014 | Binder | 30/228 |

FOREIGN PATENT DOCUMENTS

| | | |
|---|---|---|
| CN | A-101489735 | 7/2009 |
| CN | U-201563409 | 9/2010 |
| DE | 198 49 976 | 5/1999 |
| EP | 0 803 187 A2 | 10/1997 |
| EP | 1 842 632 A1 | 10/2007 |
| JP | A-H10-179952 | 7/1998 |
| JP | A-2008-048669 | 6/2008 |
| KR | B-100450494 | 7/2003 |

OTHER PUBLICATIONS

English translation of Japan Patent JP 11128561, May 1999.*

* cited by examiner

*Primary Examiner* — Hwei C Payer
(74) *Attorney, Agent, or Firm* — Drinker Biddle & Reath LLP (57) ABSTRACT

In electric scissors, a rotating motion of a motor (21) is converted into a linear motion, and a link mechanism (A) is operated to open and close blades (11, 12) by the linear motion. The electric scissors includes a current control unit (110) that controls an electric current value to the motor (21), and a detection unit (120) that detects that an angle between the blades (11, 12) becomes a predetermined angle. The current control unit (110) changes an upper limit of the electric current value to be supplied to the motor (21) when the detection unit (120) detects that the angle between the blades (11, 12) becomes the predetermined angle.

12 Claims, 6 Drawing Sheets

MOTOR REVOLUTION: 0

FIG.3(b)

MOTOR REVOLUTION: 30

FIG.4(a)

MOTOR REVOLUTION: 67.4

FIG.4(b)

MOTOR REVOLUTION: 85

ELECTRIC SCISSORS

BACKGROUND OF THE INVENTION

1. Field of the Invention

The present invention relates to electric scissors.

2. Related Art

US 2010/0192383 discloses electric scissors that open and close blade parts by a driving force of a motor, thereby cutting an object such as branches of trees and the like.

The electric scissors disclosed in US2010/0192383 are link-type electric scissors that include a first blade part, a second blade part, a first link connected to the first blade part, and a second link connected to the second blade part, and in which the first blade part and the second blade part are closed to each other when an angle between the first link and the second link is opened and the first blade part and the second blade part are opened when the angle between the first link and the second link is closed.

According to the electric scissors, it is possible to generate high cutting torque in the second half of an operation of closing the blade parts, which requires high torque when cutting an object. Hence, it is possible to obtain the torque that is required for cutting the object, without increasing a load.

In the electric scissors, the high cutting torque is generated in the second half of the operation of closing the blade parts. Thus, since the load to be applied to parts is increased in the second half of the operation of closing the blade parts, it is necessary to increase strengths of parts configuring a link mechanism, such as a link shaft and the like. However, when the strengths of the parts are increased, a weight is also increased, so that an usability of the electric scissors, which are a hand tool, is deteriorated.

SUMMARY OF THE INVENTION

Embodiments of the invention relate electric scissors that suppress load to be applied to parts, thereby suppressing a weight of the electric scissors.

BRIEF DESCRIPTION OF THE DRAWINGS

FIGS. 3(a) and 3(b) show a link mechanism of the electric scissors, in which FIG. 3(a) shows a state where blades are opened and FIG. 3(b) shows a state where a motor is rotated to reach 30 revolutions from the state where the blades are opened.

FIGS. 4(a) and 4(b) show the link mechanism of the electric scissors, in which FIG. 4(a) shows a state where the motor is rotated to reach 67.4 revolutions from the state where the blades are opened, and FIG. 4(b) shows a state where the blades are closed.

DETAILED DESCRIPTION OF THE EMBODIMENTS

An exemplary embodiment of the invention will be described with reference to the drawings.

Figure 1:
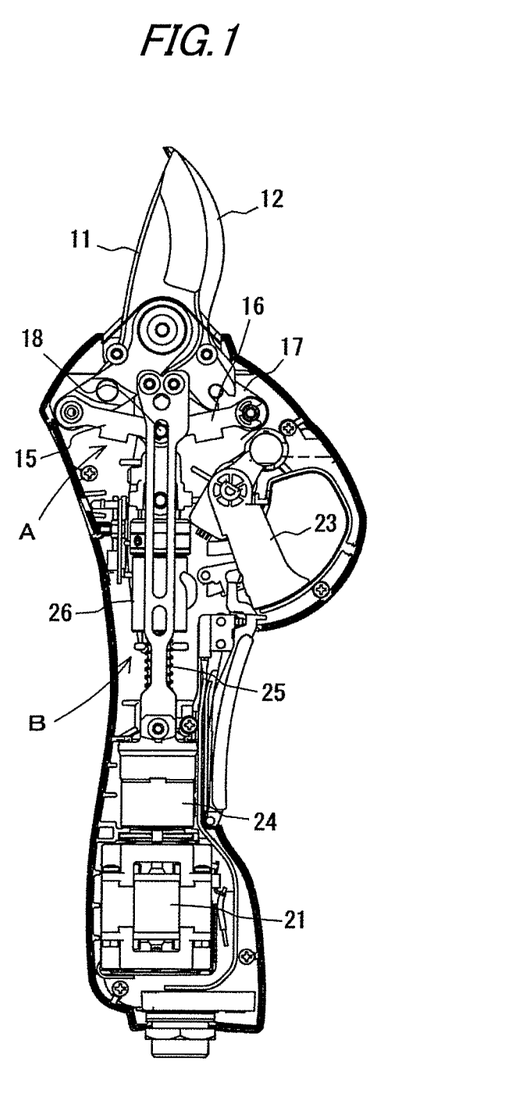
FIG. 1 shows an internal structure of electric scissors.

As shown in FIG. 1, according to electric scissors of an exemplary embodiment, a rotating force of a motor 21 is converted to a linear motion. By the linear motion, a link mechanism A is operated to execute an operation of opening and closing blades.

According to this exemplary embodiment, when a trigger 23 is operated, the motor 21 rotates to operate the electric scissors 10. Specifically, when the motor 21 rotates, the rotating motion is converted into the linear motion by a motion direction converter B and the driving force of the motor 21 converted into the linear motion is transmitted to a first movable blade part 11 and a second movable blade part 12 by the link mechanism A, so that the blades are closed.

According to this exemplary embodiment, the motor 21 is connected to a speed reducer 24 in which a rotating shaft adopts planet gears.

According to this exemplary embodiment, the motion direction converter B has a screw shaft 25 that is connected to an output shaft of the speed reducer 24 and a nut portion 26 that is engaged into thread grooves of the screw shaft 25. Thereby, when the screw shaft 25 is rotated by the driving force of the motor 21, the nut portion 26 is linearly moved along the screw shaft 25. That is, since the rotating operation of the motor 21 is converted into the linear operation of the nut portion 26, the motion direction of the nut portion 26 can be switched depending on the rotation direction of the motor 21.

As shown in FIGS. 3(a) to 4(b), the first movable blade part 11 and the second movable blade part 12 are rotatably connected to each other via a blade shaft 13 serving as a fulcrum.

The first movable blade part 11 has a blade 11a at a leading end side and a base portion 11b at the other end side with respect to a position at which the first movable blade part is supported by the blade shaft 13.

The second movable blade part 12 has a blade 12a at a leading end side and a base portion 12b at the other end side with respect to a position at which the second movable blade part is supported by the blade shaft 13.

The first movable blade part 11 and the second movable blade part 12 are configured so that as a force of separating the base portions 11b, 12b from each other is applied, the blades 11a, 12a are moved in a closing direction and a cutting operation is thus performed by the blades 11a, 12a.

The link mechanism A for operating the first movable blade part 11 and the second movable blade part 12 has a first link 15 and a second link 16 that are rotatably connected by a driving shaft 18 and a third link 17 that is connected to the second link 16.

The first link 15 is connected to the base portion 11b of the first movable blade part 11 at an opposite end to a connection end to the driving shaft 18. The first link 15 and the base portion 11b of the first movable blade part 11 are rotatably connected via a first link shaft 15a serving as a fulcrum.

The second link 16 is connected to the third link 17 at an opposite end to a connection end to the driving shaft 18. The second link 16 and the third link 17 are rotatably connected via a second link shaft 16a serving as a fulcrum.

The third link 17 is connected to the base portion 12b of the second movable blade part 12 at an opposite end to a connection end to the second link 16. The third link 17 and the base portion 12b of the second movable blade part 12 are rotatably connected via a pin 17a serving as a fulcrum.

When the nut portion 26 is linearly moved by the motion direction converter B, the driving shaft 18 connected to the nut portion 26 slides in a direction of coming close to or separating from the blade shaft 13, as shown in FIGS. 3(a) to 4(b), so that the link mechanism A is operated by the sliding motion.

Specifically, when the driving shaft 18 slides in a direction of coming close to the blade shaft 13, the link mechanism A is operated so that the first link 15, the second link 16 and the third link 17 are moved in an opening direction. Thereby, the base portions 11b, 12b of the first movable blade part 11 and the second movable blade part 12 are displaced in a direction of separating from each other and the blades 11a, 12a thereof are rotated in a closing direction each other, so that a cutting operation is performed.

Also, when the driving shaft 18 slides in a direction of separating from the blade shaft 13, the link mechanism A is operated so that the first link 15, the second link 16 and the third link 17 are moved in a closing direction. Thereby, the base portions 11b, 12b of the first movable blade part 11 and the second movable blade part 12 are displaced in a direction of coming close to each other and the blades 11a, 12a thereof are rotated in an opening direction each other, so that an operation of returning the blades to the opened state is performed.

The above operations of the electric scissors 10 are controlled by a control device 100 (refer to FIG. 2) attached in the electric scissors 10.

Figure 3A:
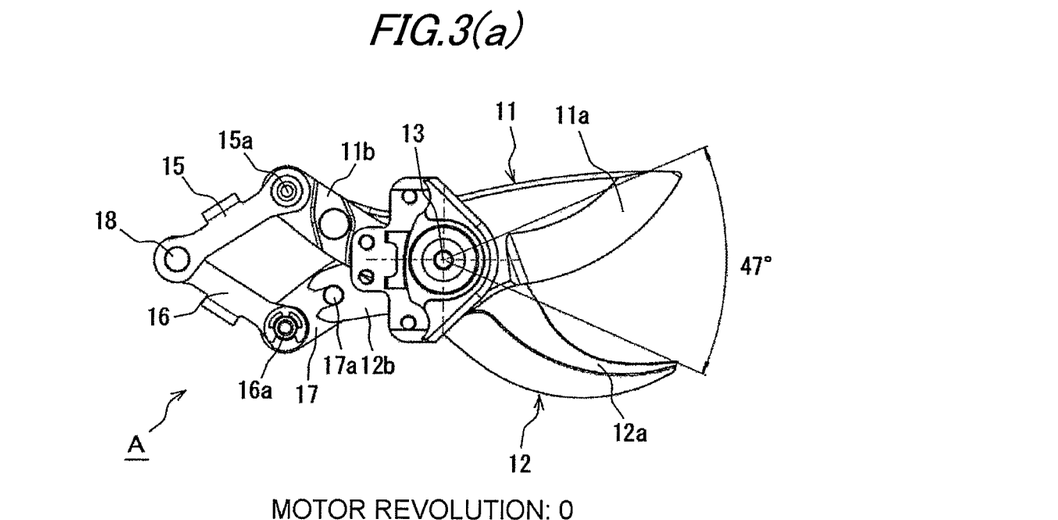
Figure 3B:
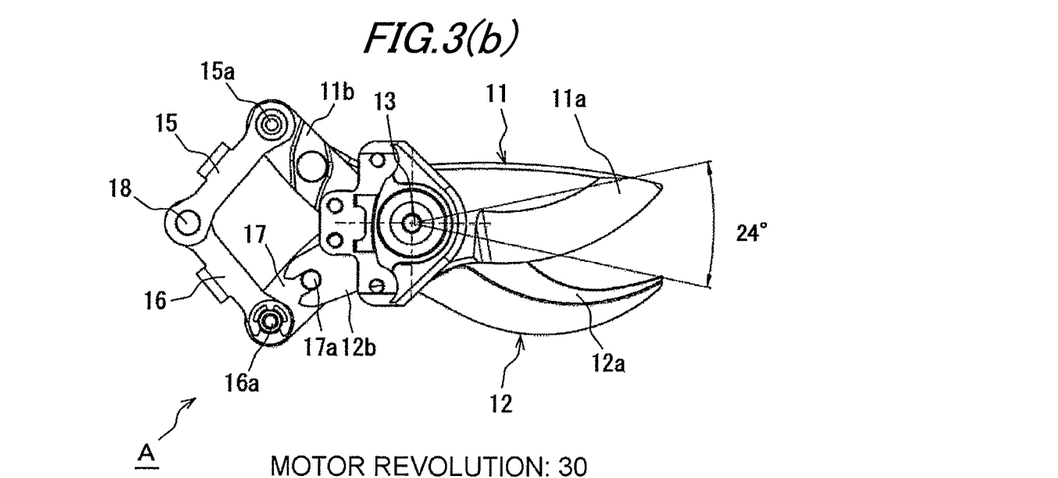
Figure 4A:
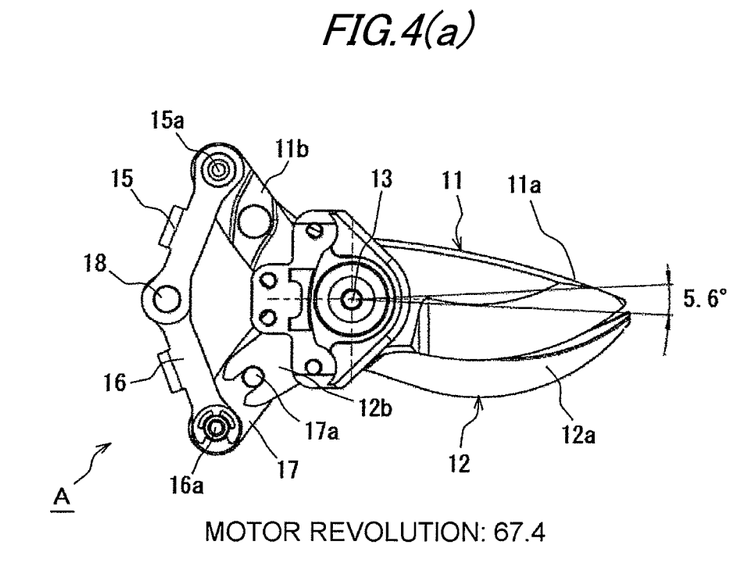
Figure 4B:
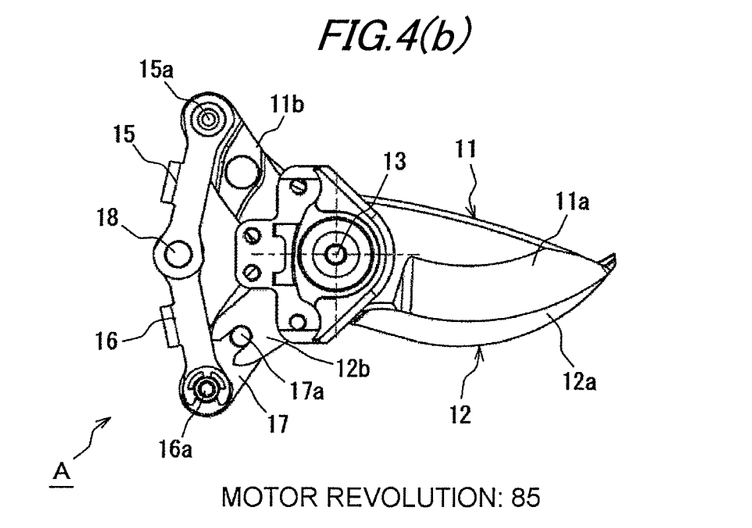

When the trigger 23 is operated to turn on a trigger switch 22, the control device 100 receives an output signal from the trigger switch 22 to positively rotate the motor 21, thereby operating the blades in the closing direction within a range from the state where the blades are opened (refer to FIG. 3(a)) to the state where the blades are closed (refer to FIG. 4(b)).

On the other hand, when the trigger 23 is released to turn off the trigger switch 22, the control device 100 receives an output signal from the trigger switch 22 to inversely rotate the motor 21, thereby operating the blades up to the state where the blades are opened (refer to FIG. 3(a)).

Figure 2:
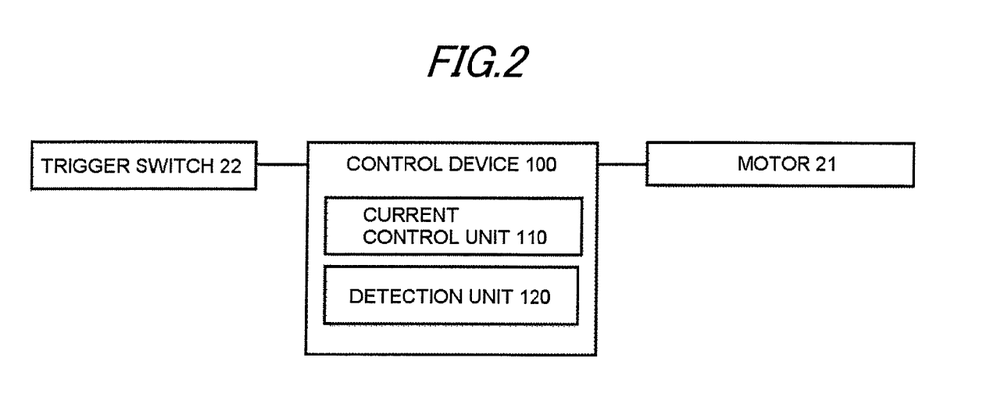
FIG. 2 is a block diagram showing input and output of the electric scissors.

The control device 100 has a detection unit 120 that counts a revolution of the motor 21. The detection unit 120 has a rotation detector (encoder) that counts the revolution of the motor 21 by counting a pulse signal that is output as the motor 21 rotates, for example.

The detection unit 120 counts the revolution of the motor 21, thereby detecting an extent of an angle at which the first movable blade part 11 and the second movable blade part 12 are closed each other.

According to an example, as shown in FIG. 3(a), when the trigger switch 22 turns on at the state where the blades are opened (initial state) and thus the motor 21 positively rotates, the detection unit 120 starts to count the revolution of the motor 21. Then, as shown in FIG. 4(b), when the revolution of the motor 21 reaches 85 revolutions, the detection unit detects that the blades are completely closed. When the detection unit 120 detects that the blades are closed, the control device 100 stops the motor 21 without further driving the motor, even through the trigger switch 22 still turns on.

To the contrary, even when the trigger switch 22 becomes off from the state where the blades are closed or from the state where the blades are being closed and thus the motor 21 inversely rotates, the detection unit 120 starts to count the revolution of the motor 21. When a predetermined revolution is detected, the detection unit detects that the blades are opened. Specifically, when the motor 21 inversely rotates by the same revolution as the revolution of the motor 21 upon the positive rotation of the motor 21, the blades are returned to the opened state (initial state) shown in FIG. 3(a). Hence, the detection unit 120 counts the revolution of the inverse rotation, thereby detecting the state where the blades are opened. When the detection unit 120 detects the state where the blades are opened, the control device 100 stops the driving of the motor 21.

The control device 100 includes a current control unit 110 that controls an electric current value to be supplied to the motor 21. According to an example, the current control unit 110 is a current limiting circuit that is provided between a power supply (not shown) such as battery disposed in the electric scissors 10 and the motor 21. The current control unit 110 is configured to perform a two-stage current limit operation. Also, the current control unit is configured to change an upper limit of the electric current value to be supplied to the motor 21.

Figure 7:
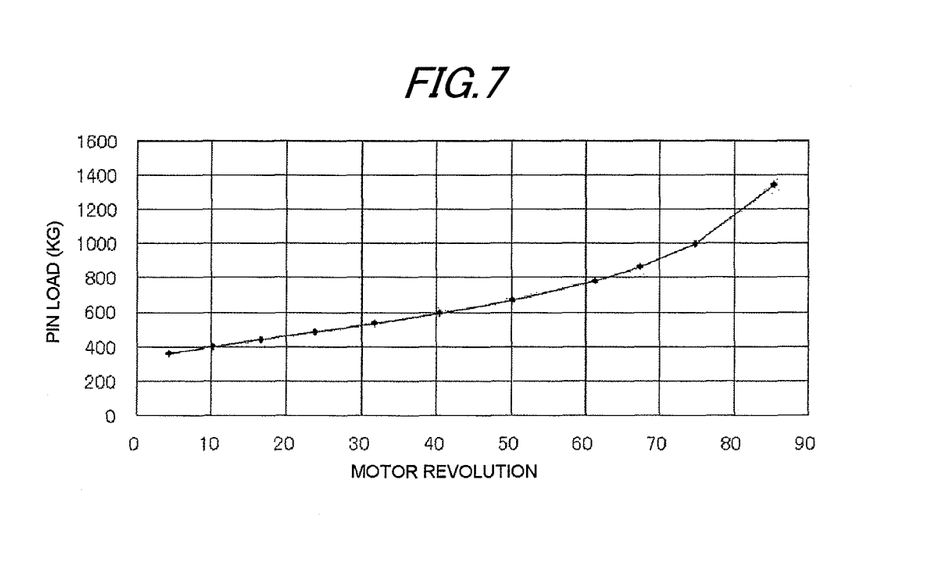
FIG. 7 is a graph showing a change in pin load in related electric scissors.

Here, FIG. 7 is a graph showing a change in load to be applied to the pin 17a in related electric scissors. As shown in FIG. 7, when the upper limit of the electric current value to be supplied to the motor 21 is not changed, the high cutting torque is generated in the second half of an operation of closing the blades. Thereby, the load to be applied to a part is increased in the second half of the operation of closing the blades.

That is, in the link mechanism A, as the blades are closed, a moving angle of the blade for each moving distance of the driving shaft 18 (which is a value obtained by dividing a 'moving angle of the blade' by a 'moving distance of the driving shaft 18') is decreased, and as the blades are closed, the cutting torque is increased, so that the load to be applied to a part is also increased.

Thus, in this exemplary embodiment, when the blades form a predetermined angle therebetween, i.e., when the blades are closed to a predetermined angle, the upper limit of the electric current value is decreased to reduce the maximum torque. Thereby, the load to be applied to a part is kept at a predetermined level.

According to an example, when the revolution of the motor 21 reaches 67.4 revolutions (at which an angle of the blades is 5.6 degrees), as shown in FIG. 4(a), the upper limit of the electric current value is changed from 50 A to 30 A, taking into consideration the upper limit of the load that a part can bear. That is, the upper limit of the electric current value to be supplied to the motor 21 is set to be 50 A from the state where the blades are opened (refer to FIG. 3(a)) to the state where the revolution of the motor 21 reaches 67.4 revolutions (refer to FIG. 4(a)). Then, the upper limit of the electric current value to be supplied to the motor 21 is set to be 30 A from the state where the revolution of the motor 21 reaches 67.4 revolutions (refer to FIG. 4(a)) to the state where the blades are closed (refer to FIG. 4(b)).

The change control on the upper limit of the electric current value may be executed as follows.

At the state (initial state) where the blades are opened, which is shown in FIG. 3(a), the current control unit 110 sets 50 A, as the upper limit of the electric current value. After that, when the motor 21 is driven and the revolution of the motor 21 reaches 67.4 revolutions, the detection unit 120 detects the corresponding state. Thereby, it is detected that the blades are closed to a predetermined angle, so that the detection unit 120 outputs a control signal to the current control unit 110. Thereby, the current control unit 110 switches the current limiting circuit, thereby setting 30 A, as the upper limit of the electric current value.

Figure 5:
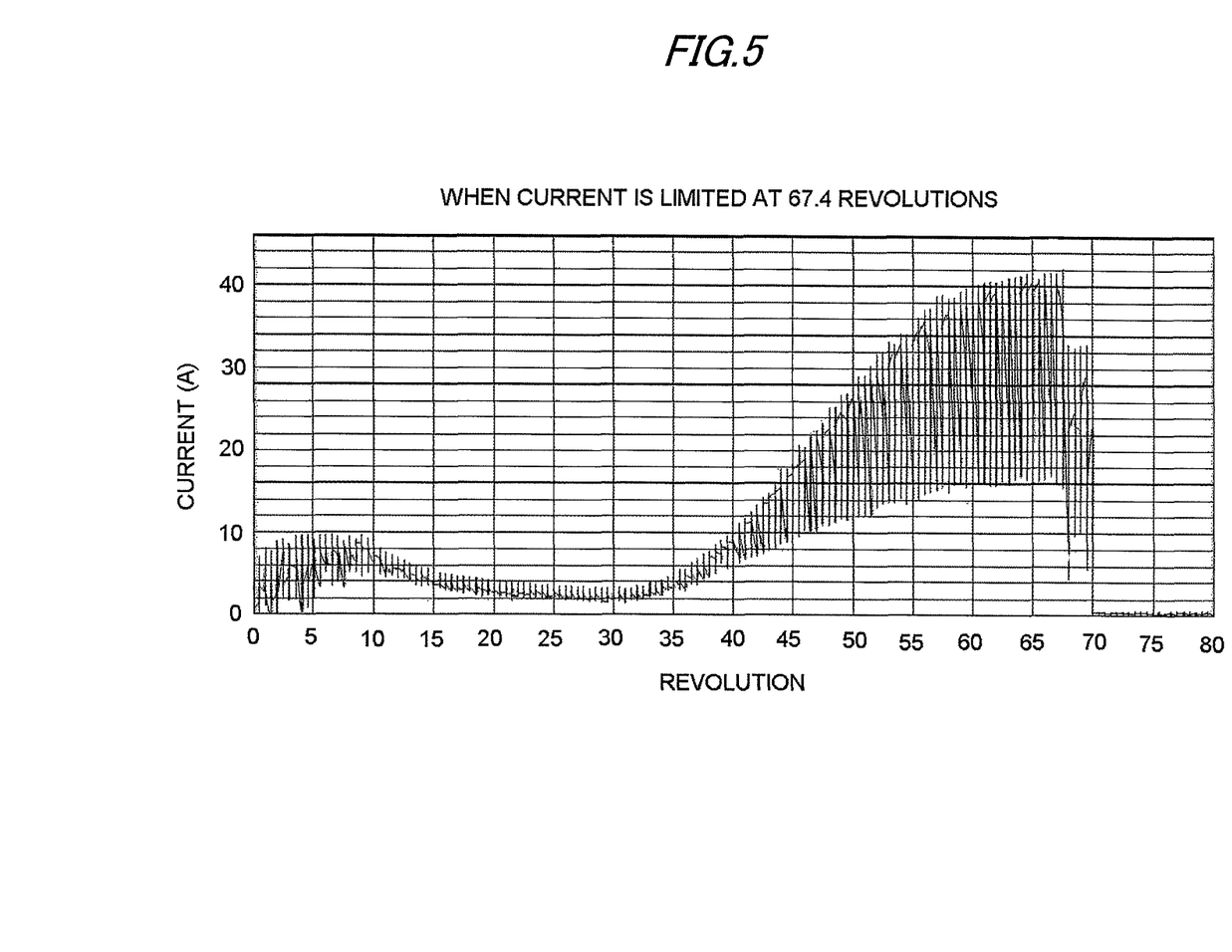
FIG. 5 is a graph showing a change in current value to be supplied to the motor.

FIG. 5 is a graph showing a change in current value to be supplied to the motor 21 according to an example. As shown in the graph, the upper limit of the current that flows until the revolution of the motor 21 reaches 67.4 revolutions is 50 A, and the current of maximum 50 A flows after the revolution of the motor exceeds 60 revolutions. If the current of 50 A continues to flow, as it is, the torque of the link mechanism A is increased in proportional to the revolution of the motor 21 even at the same current value. Hence, the load to be applied to the pin 17a is also increased in proportional to the revolution of the motor 21.

However, when the revolution of the motor 21 reaches 67.4 revolutions, the upper limit of the current is set to be 30 A. Accordingly, the upper limit of the load to be applied to the pin 17a is also corrected downward, and the torque is not excessively increased even though the revolution of the motor 21 is increased. As a result, the load to be applied to the pin 17a is kept appropriate.

Figure 6:
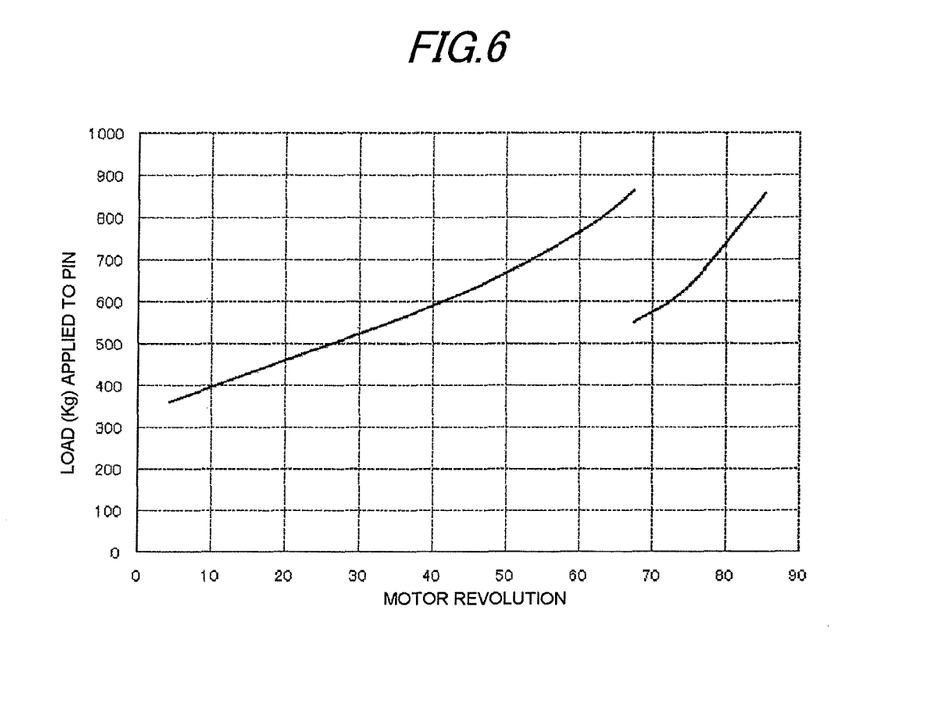
FIG. 6 is a graph showing a change in pin load.

FIG. 6 is a graph showing a change in load to be applied to the pin 17a according to an example. As shown in the graph, the load to be applied to the pin 17a is increased in proportional to the revolution until the revolution of the motor 21 reaches 67.4 revolutions. However, when the revolution of the motor 21 reaches 67.4 revolutions, the upper limit of the current is set to be 30 A, so that the load to be applied to the pin 17a is decreased. Thereafter, although the load to be applied to the pin 17a is increased in proportional to the revolution, the increased load is within a predetermined range and the excessive load is not applied.

In accordance with the above exemplary embodiment and its examples, electric scissors in which a rotating motion of a motor 21 is converted into a linear motion and a link mechanism A is operated to open and close blades 11, 12 by the linear motion may include: a current control unit 110 adapted to control an electric current value to be supplied to the motor 21; and a detection unit 120 adapted to detect that an angle between the blades 11, 12 becomes a predetermined angle. The current control unit 110 may change an upper limit of the electric current value to be supplied to the motor 21 in a condition that the detection unit 120 detects that the angle between the blades 11, 12 becomes the predetermined angle.

According to this structure, even though the high cutting torque is generated in the second half of the operation of closing the blades, when the blades are closed to the predetermined angle, the upper limit of the electric current value that is supplied to the motor 21 is decreased and the maximum torque can be thus limited, so that it is possible to prevent the load to be applied to a part from being excessively increased. Thereby, since it is not necessary to increase the strength of a part of the link mechanism A, it is possible to suppress the weight of the electric scissors.

In the above exemplary embodiment, the electric scissors have been described in which the high cutting torque is generated in the second half of the operation of closing the blades. However, the invention is not limited thereto.

For example, for electric scissors where the high cutting torque is generated in the first half of the operation of closing the blades, an operation of increasing the upper limit of the electric current value to be supplied to the motor 21 may be performed when the blades are closed to a predetermined angle. By this configuration, it may be possible to prevent the load to be applied to a part from being excessively increased in the first half of the operation of closing the blades and to generate the high torque in the second half of the operation of closing the blades.

In addition, the inventive configurations may be applied to electric scissors in which constant cutting torque is generated during the operation of closing the blades. For example, when an operation of increasing the upper limit of the electric current value to be supplied to the motor 21 is performed at the time that the blades are closed to a predetermined angle, it is possible to generate the high torque in the second half of the operation of closing the blades.

The detection unit 120 may detect that the angle between the blades 11, 12 becomes the predetermined angle by counting a revolution of the motor 21.

For example, the detection unit 120 may include a rotation detector (encoder) that counts the revolution of the motor 21.

The detection unit 120 may detect that the angle between the blades 11, 12 becomes the predetermined angle by measuring an angle of the link mechanism A or the angle between the blades 11, 12.

For example, the detection unit 120 may include a measuring equipment (angle sensor and the like) for measuring an angle of any one of the link mechanism A, the first movable blade part 11 and the second movable blade part 12. Even when such detection unit 120 is used, an angle of any one of the link mechanism A, the first movable blade part 11 and the second movable blade part 12 is measured to detect that the angle between the blades becomes the predetermined angle (for example, refer to the state of FIG. 4(*a*)).

The detection unit 120 may detect that the angle between the blades 11, 12 becomes the predetermined angle by measuring an amount of the linear motion.

For example, the detection unit 120 may include a measuring equipment (Hall IC and the like) for measuring an amount of the linear motion of the nut portion 26 or driving shaft 18 of the motion direction converter B. Even when such detection unit 120 is used, an amount of the linear motion of the nut portion 26 or driving shaft 18 of the motion direction converter B is measured to detect that the angle between the blades becomes the predetermined angle (for example, refer to the state of FIG. 4(*a*)).

Also, in the above example of the exemplary embodiment, the upper limit of the electric current value to be supplied to the motor 21 is decreased from 50 A to 30 A. However, the invention is not limited thereto. Regarding this, if the upper limit is lowered too much, the torque is excessively reduced, so that the cutting operation of the scissors may not be performed. Therefore, it is preferable to set a value considering the necessary torque. For example, when the angle between blades becomes the predetermined angle, the upper limit of the electric current value to be supplied to the motor 21 may be lowered to a range of 30 to 50%. More preferably, the upper limit may be lowered to a range of 35 to 45%.

Also, in the above example of the exemplary embodiment, in the electric scissors where the revolution of the motor 21 is 80 revolutions from the state where the blades are opened to the state where the blades are completely closed, the upper limit of the electric current value to be supplied is changed when the revolution of the motor 21 reaches 67.4 revolutions (i.e., the upper limit of the electric current value to be supplied is changed when the motor 21 is rotated to reach the revolution of about 78% of the revolution of the motor 21 from the state where the blades are opened to the state where the blades are completely closed). However, the invention is not limited thereto. Regarding this, if the timing is excessively fast, the torque is excessively reduced, so that the cutting operation of the scissors may not be performed. Therefore, it is preferable to set timing considering the necessary torque. For example, the upper limit of the electric current value to be supplied may be changed when the motor 21 is rotated to reach any one revolution within a range of 70 to 90% of the revolution of the motor 21 from the state where the blades are opened to the state where the blades are completely closed. More preferably, the upper limit of the electric current value to be supplied may be changed when the motor 21 is rotated to reach any one revolution within a range of 80 to 85% of the revolution of the motor 21 from the state where the blades are opened to the state where the blades are completely closed Also, in the above exemplary embodiment, the example has been described in which it is detected that the blades are closed to a predetermined angle from the opened state. However, it may be detected that the blades are opened to a predetermined angle from the closed state. For example, when the blades get stuck in the branches and are thus stopped without completely cutting the branches upon cutting the branches, the torque is generated with respect to the operation of opening (returning) the blades, so that the link mechanism A is applied with the load. In this case, when the current control unit 110 is configured to change the upper limit of the electric current value to be supplied to the motor 21 at the time that the detection unit 120 detects that the blades are opened to a predetermined angle, it is possible to limit the load to be applied to the link mechanism A and to thus prevent the damage of the link mechanism A.

What is claimed is:

1. Electric scissors in which a rotating motion of a motor is converted into a linear motion and a link mechanism is operated to open and close blades by the linear motion, the electric scissors comprising:
   a current control unit adapted to control an electric current value to be supplied to the motor; and
   a detection unit adapted to detect that an angle between the blades becomes a predetermined angle,
   wherein the current control unit changes an upper limit of the electric current value to be supplied to the motor in a condition that the detection unit detects that the angle between the blades becomes the predetermined angle.

2. The electric scissors according to claim 1, wherein the detection unit is adapted to detect that the angle between the blades becomes the predetermined angle by counting a revolution of the motor.

3. The electric scissors according to claim 1, wherein the detection unit is adapted to detect that the angle between the blades becomes the predetermined angle by measuring an angle of the link mechanism or the angle between the blades.

4. The electric scissors according to claim 1, wherein the detection unit is adapted to detect that the angle between the blades becomes the predetermined angle by measuring an amount of the linear motion converted from the rotating motion of the motor.

5. The electric scissors according to claim 1, wherein the current control unit is adapted to set the upper limit of the electric current value to be supplied to the motor to a value reduced to a range of 30 to 50% of an upper limit of the electric current value before the angle between the blades becomes the predetermine angle, in the condition that the detection unit detects that the angle between the blades becomes the predetermined angle.

6. The electric scissors according to claim 1, wherein said predetermined angle is an angle which is formed between the blades when the motor is rotated to reach a revolution within a range of 70 to 90% of a revolution of the motor from a state where the blades are completely opened to a state where the blades are completely closed or from a state where the blades are completely closed to a state where the blades are completely opened.

7. Electric scissors in which a rotating motion of a motor is converted into a linear motion and a link mechanism is operated to open and close blades by the linear motion, the electric scissors comprising:
   a current controller adapted to control an electric current value to be supplied to the motor; and
   a detector adapted to detect that an angle between the blades becomes a predetermined angle,
   wherein the current controller changes an upper limit of the electric current value to be supplied to the motor in a condition that the detector detects that the angle between the blades becomes the predetermined angle.

8. The electric scissors according to claim 7, wherein the detector is adapted to detect that the angle between the blades becomes the predetermined angle by counting a revolution of the motor.

9. The electric scissors according to claim 7, wherein the detector is adapted to detect that the angle between the blades becomes the predetermined angle by measuring an angle of the link mechanism or the angle between the blades.

10. The electric scissors according to claim 7, wherein the detector is adapted to detect that the angle between the blades becomes the predetermined angle by measuring an amount of the linear motion converted from the rotating motion of the motor.

11. The electric scissors according to claim 7, wherein the current controller is adapted to set the upper limit of the electric current value to be supplied to the motor to a value reduced to a range of 30 to 50% of an upper limit of the electric current value before the angle between the blades becomes the predetermine angle, in the condition that the detector detects that the angle between the blades becomes the predetermined angle.

12. The electric scissors according to claim 7, wherein said predetermined angle is an angle which is formed between the blades when the motor is rotated to reach a revolution within a range of 70 to 90% of a revolution of the motor from a state where the blades are completely opened to a state where the blades are completely closed or from a state where the blades are completely closed to a state where the blades are completely opened.

* * * * *